United States Patent [19]

Okura et al.

[11] Patent Number: 4,965,884

[45] Date of Patent: Oct. 23, 1990

[54] DATA ALIGNMENT METHOD AND APPARATUS

[75] Inventors: David K. Okura, Nepean; John A. Gauthier, Kanata; Trevor R. Hill, Nepean, all of Canada; Simon A. MacKenzie, Melbourne, Australia

[73] Assignee: Northern Telecom Limited, Montreal, Canada

[21] Appl. No.: 440,157

[22] Filed: Nov. 22, 1989

[51] Int. Cl.$^5$ ............................................. H04L 7/00
[52] U.S. Cl. .................................. 375/106; 370/105.1
[58] Field of Search .................. 375/106, 118, 85, 86, 375/102; 328/63, 72; 307/523, 524; 370/100.1, 105.1

[56] References Cited

U.S. PATENT DOCUMENTS

| | | | |
|---|---|---|---|
| 4,672,639 | 6/1987 | Tanabe et al. ........................ | 375/118 |
| 4,756,011 | 7/1988 | Cordell .................................. | 375/86 |
| 4,757,452 | 7/1988 | Scott et al. ........................... | 375/118 |
| 4,791,652 | 12/1988 | McEachern et al. ................. | 370/102 |
| 4,805,198 | 2/1989 | Stern et al. ........................... | 375/118 |

Primary Examiner—Douglas W. Olms
Assistant Examiner—Stephen Chin
Attorney, Agent, or Firm—Dallas F. Smith

[57] ABSTRACT

A method and apparatus are provided for receiving parallel digital data signals and an aligned frame pulse. The frame pulse occurs at a regular interval which is a multiple of the data clock period. A multiple clock sampling scheme includes sampling the frame pulse using a plurality of phase-shifted clock signals, selecting several clock signals which are centered on the frame pulse and therefore the data. Then, sampling the data using the selected clocks, taking a majority value of the multiple samples and aligning the sampled data with a locally generated frame pulse using an elastic store.

12 Claims, 2 Drawing Sheets

DATA ALIGNMENT METHOD AND APPARATUS

BACKGROUND OF THE INVENTION

This invention relates to a method and apparatus for receiving parallel digital data signals and an aligned frame pulse using a reference clock signal and in particular to aligning the data signals with a locally generated frame pulse which is phase aligned with the reference clock signal.

The requirements of moving vast amounts of information within digital communications systems has led to increases in both the rate at which data is transmitted along a line and the number of lines used in parallel to form data bus structures. Two problems arise when the data signal rate is greater than 10 MHz. The first is devising a technique to sample the data when the data is being clocked at a rate much greater than an order of magnitude above the fastest rate technologically available. The second is providing for a phase shift between the data signal and the reference clock signal of greater than one clock period.

Clock recovery circuits are designed to align the clock signal with the data signal to ensure accurate sampling of the data. One way to provide clocks needed to sample the high rate data signal for aligning the clock signal and the high rate data signal is to provide multiple delayed clock signals by passing the reference clock signal through a multiple tap delay line.

Such a scheme is taught by H. Wong et al. U.S. Pat. No. 4,584,695 issued Apr. 22, 1986 and assigned to National Semiconductor Corporation. In a digital PLL clock recovery scheme Wong et al. disclose a multiphase clock generator providing clock signals which are phase offset from one another. A single one of these clock signals is then used to sample the data signal, at, slightly before, and after a clock signal transition. The resulting bit pattern is used to determine whether a leading or lagging phase clock should be substituted. The Wong et al. arrangement is applied to Manchester data, that is serial data having an encoded clock signal and a mid-bit transition.

Another scheme is taught by Bergmann et al. U.S. Pat. No. 4,821,297, issued Apr. 11, 1989 and assigned to American Telephone and Telegraph Company. Bergmann et al. use delay lines on both the data and the clock inputs. The delay line on the data input provides phase-shifted data signals to be sampled by a single one of the multiple phase clock signals. As with Wong et al., the resulting bit pattern is used to determine whether a leading or lagging clock signal should be selected. In an alternative embodiment Bergmann et al. use three clock signals of adjacent phase to sample the data signal in place of the data delay line. The Bergmann et al. scheme is applicable to serial data signals and is not dependent upon the coding scheme used for that data.

Silicon CMOS integrated circuits introduce wide time differences or deltas between their best case propagation delays and their worst case propagation delays. The deltas are primarily due to operating temperature variation, supply voltage variation and chip processing variation. As data transmission rates have increased, the magnitude of the deltas can exceed one bit. To transmit the greatest amount of data within the limitations of the technology used, parallel data transmission is chosen, but a scheme for reliable reception of the data is required.

SUMMARY OF THE INVENTION

An object of the present invention is to provide an improved method and circuit for receiving frame aligned parallel digital data.

In accordance with an aspect of the present invention there is provided a method for receiving parallel data signals and a frame pulse aligned with the data signals, comprising the steps of sampling the frame pulse using a plurality of clocks, each clock being phase shifted with respect to each other clock, selecting a number of the plurality of clocks in dependence upon a predetermined value of the sampled frame pulse, sampling the data signals using the selected clocks, choosing a data sample representing a majority of the data samples to provide a sampled data signal, and aligning a sampled data signal with the local frame pulse.

Thus according to the method of the present invention the selection of the sampling clocks is based upon sampled values of the frame pulse rather than of the data signals.

Preferably, the step of selecting a number of the plurality of clocks includes the step of switching to the clocks in a manner to ensure glitchless switching of the clocks used for sampling the data.

In accordance with another aspect of the present invention there is provided apparatus for receiving parallel data signals and a frame pulse aligned with the data signals, comprising means for sampling the frame pulse using a plurality of clocks, each clock being phase shifted with respect to each other clock, means for selecting some of the plurality of clocks in dependence upon a predetermined value of the frame pulse sampled, means for sampling the data signals using the selected clocks, means for choosing a data sample representing a majority of the data samples to provide a sampled data signal, and means for aligning the sampled data signal with a local frame pulse.

Preferably, the means for selecting a number of the plurality of clocks comprises means for switching to the clocks in a manner to ensure glitchless switching of the clocks used for sampling the data.

In an embodiment of the present invention the means for switching to the m selected clocks comprises a tristate driver matrix.

In accordance with a further aspect of the present invention there is provided apparatus for receiving parallel data signals and a frame pulse aligned with the data signals, comprising a first set of latches for sampling the frame pulse using six clock signals, each clock signal being phase shifted with respect to each other clock signal, a shift register for storing several of the frame pulse samples received from the first set of latches, a logic circuit for selecting three of six clock signals which are most centered on a predetermined value of the frame pulse sampled, a tristate drive matrix for switching to the three selected clocks in a glitchless manner, a second set of latches for sampling the data signals and the frame pulse using the three clock signals from the tristate drive, a majority circuit for choosing a data signals sample and a frame pulse sample representing a majority of the three data signals samples and the three frame pulse samples to provide sampled data signals and a sampled frame pulse, and an elastic store for aligning the sampled data signal with a local frame pulse, and whereby writing the sampled data signal to memory is in dependence upon one of the selected clocks and the sampled frame pulse and reading the sampled data signal from memory is in dependence upon a local frame pulse aligned with the local clock signal.

BRIEF DESCRIPTION OF THE DRAWINGS

The present invention will be further understood from the following description with reference to the drawings in which.

DETAILED DESCRIPTION

Figure 1:
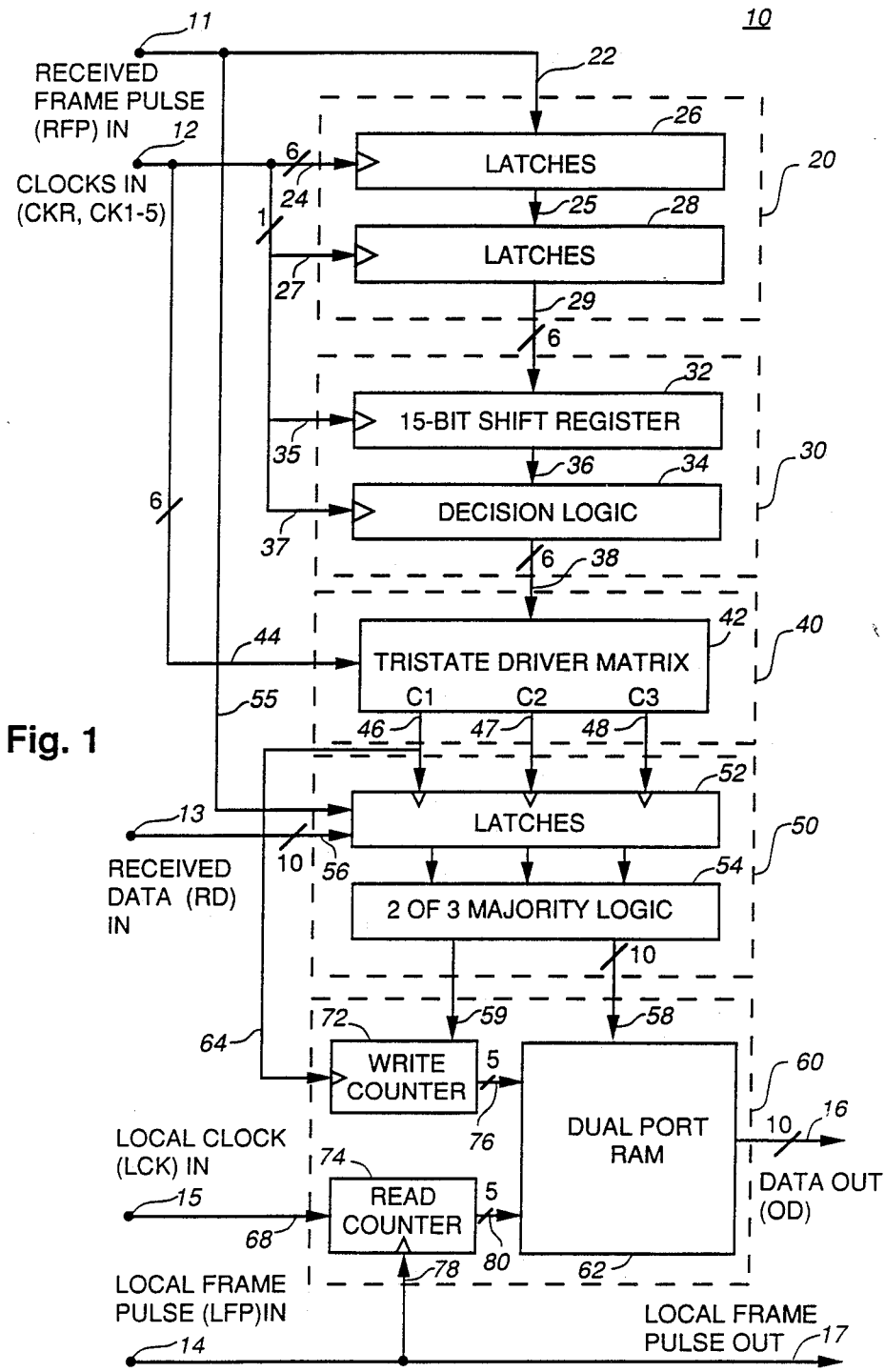
FIG. 1 illustrates in block diagram form a data alignment circuit in accordance with a first embodiment of the present invention.

Referring to FIG. 1, there is provided a data alignment circuit 10 in accordance with an embodiment of the present invention. The data alignment circuit 10 includes a frame pulse receiver 20, a state machine 30, a data clock selector 40, a data receiver 50, and an elastic store 60. The data alignment circuit 10 has inputs for a received frame pulse (RFP) 11, multiple phase shifted clock signals (CK1-CK5), including a reference clock signal (CKR) 12, a 10-bit received data signal (RD) 13, a local frame pulse (LFP) 14, and a local clock signal (LCK) 15. The data alignment circuit 10 has outputs for 10-bit aligned output data (OD) 16 and a local frame pulse (LFP) 17.

The frame pulse receiver 20 includes a first set of latches 26 coupled to the input 11 via a line 22 and clock signals input 12 via a 6-line clock bus 24, and a second set of latches 28 coupled to latches 26 via a-6-bit bus 25 and one of the clock signals via a line 27. Output from latches 28 is applied as an input to the state machine 30 via a 6-bit bus 29.

The state machine 30 includes a 15-bit shift register 32 and a decision logic circuit 34. The 15-bit shift register 32 provides storage for two and one-half 6-bit samples received from latches 28. The 15-bit shift register 32 and the decision logic circuit 34 are clocked by the same clock signal as latches 28 via lines 35 and 37, respectively. The decision logic circuit 34 is coupled to the 15-bit shift register 32 via a 15-bit bus 36 and has its output applied as an enabling input to the data clock selector 40 via 6-bit bus 38.

The data clock selector 40 includes a matrix of tristate drivers 42. Each driver provides a switch for glitchless switching of selected clocks. The data clock selector 40 is coupled to the clock input 12 via a 6-line clock bus 44 and outputs selected clock C1, C2, and C3 via lines 46, 47, and 48, respectively.

The data receiver 50 includes latches 52 and a 2 of 3 majority logic circuit 54. The selected clocks C1, C2, and C3 are applied as clock inputs to the latches 52 along with the received data RD via a 10-bit data bus 56 and the received frame pulse RFP via a line 55. Each triple data sample and triple frame pulse sample is input to the 2 of 3 majority logic circuit 54 which outputs the data via a respective line of the bus 58 and the frame pulse via a line 59.

The elastic store 60 includes a dual port RAM 62, a write counter 72 and a read counter 74. The dual port RAM 62 has inputs for receiving the sampled data from the data receiver 50 via a 10-bit data bus 58, for receiving a write address signal from the write counter 72 via a 5-bit bus 76 and for receiving a read address signal from the read counter 74 via a 5-bit bus 80. The dual port RAM 62 has a 10-bit data bus output 16 for outputting data OD aligned with the local frame pulse LFP. The write counter 72 has a clock input via a line 64 for the selected clock signal C1 and an input via the line 59 for the sampled frame pulse. The write counter 72 outputs a write address signal via the 5-bit bus 76 to the dual port RAM 62. The read counter 74 has an input via a line 68 for the local clock signal LCK from the local clock input 15 and an input via a line 78 for the local frame pulse LFP from the input 14. The read counter 74 outputs a read address to the dual port RAM 62 via a 5-bit bus 80.

In operation, the received frame pulse RFP, sent every 64 clock periods, and received via the input 11 and the line 22 is sampled by latches 26 at the intervals provided for by the six phase-shifted clocks (CKR, CK1-CK5) input via the 6-line clock bus 24. The resulting 6-bit sample is clocked into the second set of latches 28 using one of the multiple clocks applied to latches 28 via the line 27. The second set of latches 28 provides a metastable settling time for the sample before being output to the state machine 30.

The 6-bit sample is then clocked, by the clock supplied by the line 35, into the 15-bit shift register 32, of the state machine 30, so that the most recent bit of the sample is the least significant bit. On each clock cycle, the sample is shifted within the 15-bit shift register 32 by 6 bits. Thus the 15-bit register 32 provides two and one-half samples arranged in order from the most recent bit.

The decision logic circuit 34 examines the contents of the register 32, via the 15-bit bus 36, every clock cycle looking for a frame pulse. Once found, based upon the position of the frame pulse within the shift register, the decision logic circuit 34 chooses a set of three clocks most centered on the frame pulse. There are six possible sets of three clocks which may be selected by the decision logic circuit 34. The bus 38 provides 6 lines, one for each of the six possible sets.

The data clock selector 40 using the matrix of tristate drivers 42, coupled to lines 46, 47, and 48, provides the three selected clocks, C1, C2, and C3 to the data receiver 50. When shifting to a phase-delayed clock, the clock period at the time of the switch is extended by the amount of the phase delay. When shifting to a phase-advanced clock, the clock period at the time of the switch is shortened by the amount of the phase delay. As the data alignment circuit 10 is intended to compensate for temperature and voltage drift, the logic used in the tristate matrix for glitchless clock switching provides for a clock change of one phase shift per frame pulse period. Thus although the decision logic circuit 34 is capable of switching from any set of three clocks to any other set of three clocks via the bus 38, glitchless operation is available in this tristate driver matrix for a single phase shift of the clocks, that is, up one, down one, or stay the same.

While a single phase increment circuit has been discussed, it would be possible to provide for a greater rate of phase change by using a different clock selection circuit and tristate matrix.

In the data receiver 50, latches 52 sample the data from the data bus 56 and the received frame pulse via the bus 55 using each of the three clocks C1, C2, and C3. The majority value of sampled values is chosen by the 2 of 3 majority circuit 54 and the data sample is output via the bus 58 and the frame pulse sample FP is output via the line 59 to the elastic store 60.

The dual port RAM 62 provides storage which allows the data to be aligned with the local frame pulse. Data is written into the dual port RAM 62 at the addresses specified by the write counter 72 which is aligned to the sampled data input via the bus 58 using the sampled frame pulse FP and the clock C1. The output from the dual port RAM 62 is obtained from the address specified by the read counter 74 which is aligned to the local frame pulse LFP input via the line 78 and clocked by the local clock LCK input via the line 68. The local frame pulse LFP and the local clock LCK are synchronous prior to being input to the data alignment circuit 10. Thus, the output data OD is brought into phase alignment with the local frame pulse.

Figure 2:
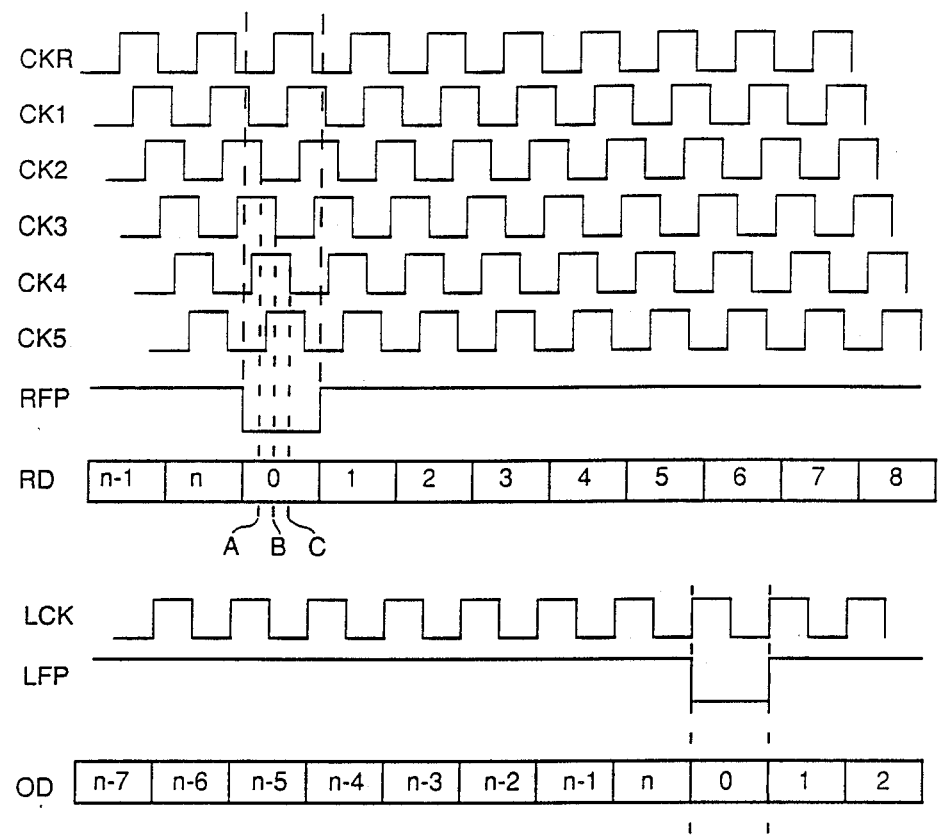
FIG. 2 illustrates a timing diagram for the embodiment of FIG. 1.

In FIG. 2, a timing diagram is illustrated for a typical operation of the circuit of FIG. 1. The reference clock signal CKR is delayed in steps to provide five phase shifted clock signals CK1 through CK5, which together with the reference clock CKR effectively span one clock period. Each of these clock signals is used to sample the received frame pulse RFP. Those clock signals whose edge (1 to 0 transition) A, B, and C lies centered within the frame pulse are selected to sample the received data RD. As the received frame pulse and the received data are aligned, the clock signals centered on the framed pulsed RFP will also be centered on a bit of the received data RD. The local frame pulse LFP and the local clock LCK are synchronous prior to input to the data alignment circuit, and may be offset from the received frame pulse RFP by any number of clock periods (plus or minus) within a limit of the elastic store. In the present embodiment the limit is +16 to −14 clock periods. As shown in FIG. 2, the offset is approximately +6. However, this offset is system dependent and can vary to the full limit of the elastic store, the received clocks and the frame pulse and the local clock and the frame pulse must ultimately be synchronized to the same source. The output data OD is shown having its 0th bit aligned with the local frame pulse LFP, which is the same relationship the received frame pulse RFP has with the received data RD.

While a circuit has been discussed in which the clocks selected are those centered on the frame pulse, which correspond to being centered on the data bit, it is possible to use this circuit in a system using a data coding scheme for which such centering was undesirable by changing the clock selection parameters.

Numerous modifications, variations and adaptations may be made to the particular embodiment of the invention described above without departing from the scope of the invention, which is defined in the claims.

What is claimed is:

1. A method for receiving parallel data signals and a frame pulse aligned with the data signals, comprising the steps of:
    sampling the frame pulse using a plurality of clocks, each clock being phase shifted with respect to each other clock;
    selecting a number of the plurality of clocks in dependence upon a predetermined value of the sampled frame pulse;
    sampling the data signals using the selected clocks;
    choosing a data sample representing a majority of the data samples to provide a sampled data signal; and
    aligning the sampled data signal with a local frame pulse.

2. A method as claimed in claim 1 further comprising the steps of sampling the frame pulse using the selected clocks and choosing a frame pulse sample representing a majority of the frame plus samples to provide a sampled frame pulse.

3. A method as claimed in claim 2 wherein the step of selecting a number of the plurality of clocks includes the step of switching to the selected clocks in a glitchless manner.

4. A method as claimed in claim 3 wherein the step of aligning includes the steps of writing the sampled data signal to memory in dependence upon one of the selected clocks and the sampled frame pulse and reading the sampled data signal from memory in dependence upon a local clock signal and the local frame pulse aligned with the local clock signal.

5. Apparatus for receiving parallel data signals and a frame pulse aligned with the data signals, comprising:
    means for sampling the frame pulse using a plurality of clocks, each clock being phase shifted with respect to each other clock;
    means for selecting a number of the plurality of clocks in dependence upon a predetermined value of the frame pulse sampled;
    means for sampling the data signals using the selected clocks;
    means for choosing a data sample representing a majority of the data samples to provide a sampled data signal; and
    means for aligning the sampled data signal with a local frame pulse.

6. Apparatus as claimed in claim 5 wherein the means for sampling the frame pulse comprises a set of latches, each latch having an input for the frame pulse and a clock input.

7. Apparatus as claimed in claim 6 wherein the means for selecting a number of the plurality of clocks comprises means for switching to the selected clocks in a glitchless manner.

8. Apparatus as claimed in claim 7 wherein the means for switching to the selected clocks comprises a tristate driver matrix.

9. Apparatus as claimed in claim 7 wherein the means for sampling the data signals comprises a set of latches for each data signal; each latch having a respective one of the selected clock signals as a clock input.

10. Apparatus as claimed in claim 9 wherein the means for aligning the sampled data signal with the local frame pulse comprises an elastic store including means for writing the sampled data signal to memory in dependence upon one of the selected clocks and the sampled frame pulse and means for reading the sampled data signal from memory in dependence upon the local clock signal and a local frame pulse aligned with the local clock signal.

11. Apparatus as claimed in claim 7 wherein means for sampling the frame pulse uses 6 clocks and means for selecting selects 3 clocks and where the means for selecting comprises a 15-bit shift register and a decision logic circuit, wherein the decision logic circuit examines the contents of the 15-bit shift register to detect a frame pulse and selects the three clocks in dependence upon the frame pulse position within the 15-bit register.

12. Apparatus for receiving parallel data signals and a frame pulse aligned with the data signals, comprising:
    a first set of latches for sampling the frame pulse using six clock signals, each clock signal being phase shifted with respect to each other clock signal;

a shift register for storing several of the frame pulse samples received from the first set of latches;

a logic circuit for selecting three of six clock signals which are most centered on a predetermined value of the frame pulse sampled;

a tristate drive matrix for switching to the three selected clocks in a glitchless manner;

a second set of latches for sampling the data signals and the frame pulse using the three clock signals from the tristate drive;

a majority circuit for choosing a data signals sample and a frame pulse sample representing a majority of the three data signals samples and the three frame pulse samples to provide sampled data signals and a sampled frame pulse;

an elastic store including a memory for aligning the sampled data signal with a local frame pulse; and whereby writing the sampled data signal to the memory is in dependence upon one of the selected clocks and the sampled frame pulse and reading the sampled data signal from the memory is in dependence upon a local clock signal and the local frame pulse aligned with the local clock signal.

* * * * *